United States Patent [19]
Takemura et al.

[11] Patent Number: 5,687,615
[45] Date of Patent: Nov. 18, 1997

[54] MANUAL TRANSMISSION

[75] Inventors: Tadashi Takemura; Kazuo Takami, both of Kyoto; Shinji Nishioka, Kameoka, all of Japan

[73] Assignee: Mitsubishi Jidosha Kogyo Kabushiki Kaisha, Tokyo, Japan

[21] Appl. No.: 527,321

[22] Filed: Sep. 12, 1995

[30] Foreign Application Priority Data

Sep. 14, 1994 [JP] Japan ................................. 6-219937

[51] Int. Cl.$^6$ .................................................. F16H 63/38
[52] U.S. Cl. ................................................ 74/475; 74/339
[58] Field of Search ................... 74/475, 339; 192/53.341

[56] References Cited

U.S. PATENT DOCUMENTS

| | | | |
|---|---|---|---|
| 2,435,929 | 2/1948 | Plexico | 192/53.341 X |
| 4,432,251 | 2/1984 | Malott . | |
| 4,467,665 | 8/1984 | Katayama et al. . | |
| 4,590,818 | 5/1986 | Teraoka . | |

FOREIGN PATENT DOCUMENTS

| | | |
|---|---|---|
| 3117038 | 8/1982 | Germany . |
| 3202470 | 8/1982 | Germany . |
| 396391 | 8/1993 | Germany . |
| 4407540 | 9/1994 | Germany . |
| 60-215426 | 10/1985 | Japan . |
| 2168117 | 6/1986 | United Kingdom . |
| 429167 | 5/1991 | United Kingdom . |

*Primary Examiner*—Allan D. Herrmann

[57] ABSTRACT

A manual transmission includes a shift rail connected to a shift lever and supported by a housing so as to be axially movable, a sleeve connected to the shift rail, and a poppet plug for positioning the shift rail. When the speed change is completed by the operation of shift lever, the positioning ball of the poppet plug engages with one of poppet grooves formed in the shift rail, and the end portion of the shift rail abuts on the housing surface. As a result, the shift rail is axially held by the housing surface and the positioning ball of the poppet plug, so that the axial displacement of the shift rail is prevented. For this reason, even if a vibration occurs on the sleeve, the transmission of vibration from the sleeve to the shift lever via interposing elements including the shift rail is prevented, whereby a feeling of shifting operation is improved.

11 Claims, 7 Drawing Sheets

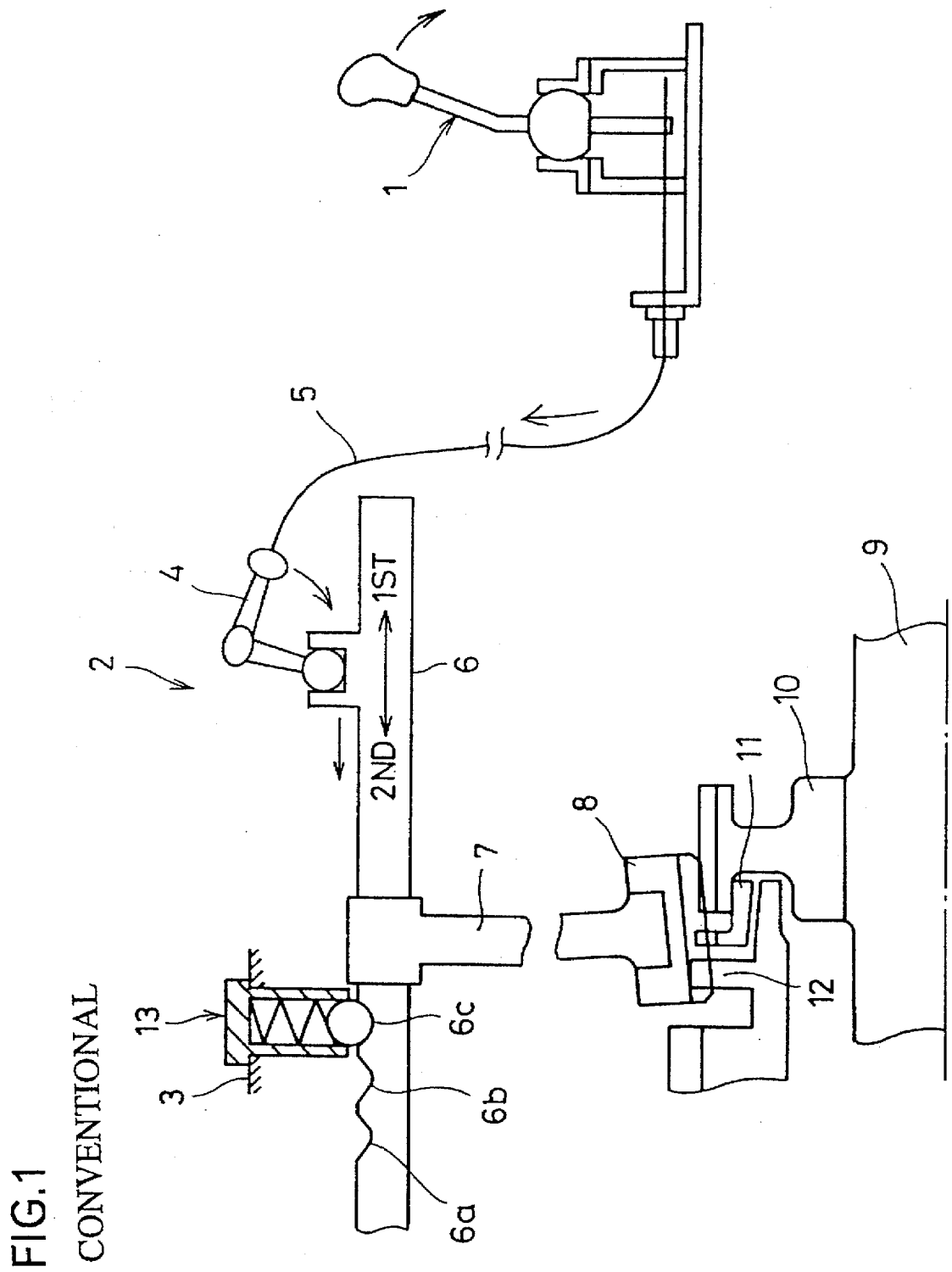
FIG.1 CONVENTIONAL

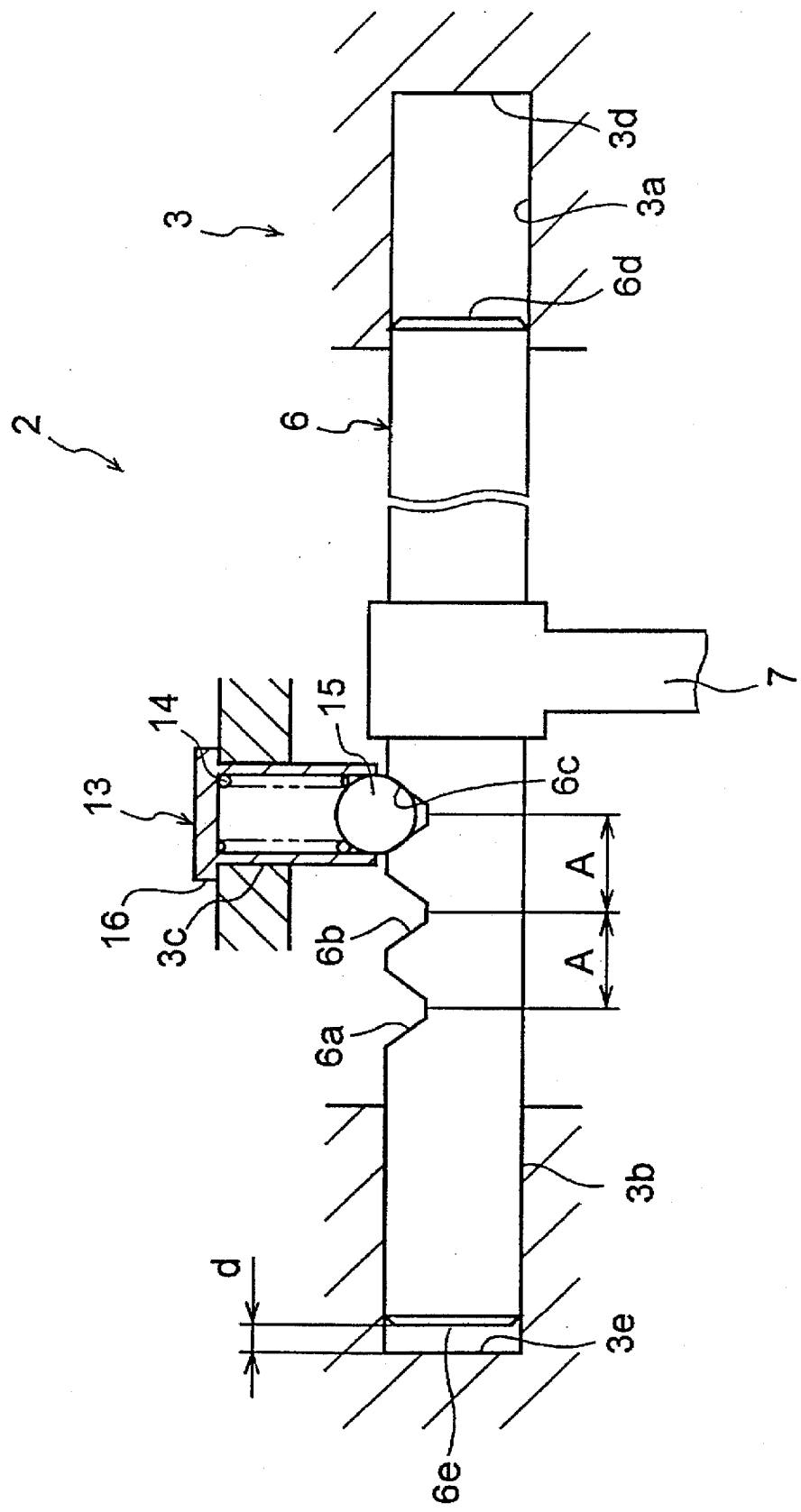
FIG.2 CONVENTIONAL

MANUAL TRANSMISSION

BACKGROUND OF THE INVENTION

1. Field of the Invention

The present invention relates to a manual transmission.

2. Description of the Related Art

A normally engaged manual transmission having a plurality of pairs of gears is known. Typically, in the transmission of this type, one of gears of each pair is mounted to the main shaft of the transmission in such a manner as to slip, and the other gear is fixed to the countershaft of the transmission. When a shift lever is operated, a sleeve connected to the shift lever slides along the main shaft to engage with a desired gear, by which the gear and the main shaft are connected to each other via the sleeve so that a desired speed (gearshift position) is established. For the transmission of this type, a synchronously engaged transmission is known, which is equipped with a synchronization mechanism such as to eliminate the difference in circumferential speed between the main shaft and the gear to be connected thereto in order to perform smooth speed change. Also, two types of operating devices for sliding the sleeve are available: a direct control type in which the shift lever is attached directly to the transmission, and a remote control type in which the transmission and the shift lever are connected to each other via a link or a cable.

FIGS. 1 and 2 show a key type manual transmission of remote control type. The key type transmission is classified as a synchronously engaged transmission. The synchronization mechanism thereof includes synchronization rings disposed at both sides of a key mounted on the hub on the main shaft side. In FIG. 1, concerning the synchronization mechanism, the elements on the second speed side only are shown.

Referring to FIG. 1, a shift lever 1 operable by a driver is connected, via a shift cable 5, to a transmission lever 4 pivotally mounted to a housing 3 of the transmission 2, and the lever 4 is connected to a shift rail 6. As shown in FIG. 2, opposite ends of the shift rail 6 are inserted to holes 3a and 3b formed in the housing 3, respectively. Therefore, the shift rail 6 is supported by the housing 3 in such a manner as to move in the axial direction. On the outer peripheral surface at the intermediate portion of the shift rail 6, poppet grooves (engagement grooves) 6a, 6b, and 6c are formed at three positions in the axial direction of the shift rail corresponding to the first speed, neutral, and second speed positions, respectively. In FIG. 2, reference character A denotes the center distance between the poppet grooves 6a and 6b and the center distance between the poppet grooves 6b and 6c. When speed (gearshift position) is changed from neutral to first speed or second speed, the shift rail 6 moves over the same distance as the center distance A.

A cylindrical poppet plug 13, which is a mechanism for positioning the shift rail 6, is mounted in a hole 3c in the housing 3. In a body 16 of the poppet plug 13 are disposed a spring 14 and a positioning ball 15. The ball 15 is urged against the shift rail 6, and partially protrudes from the opening of the plug body 16 so as to abut on the outer peripheral surface of the shift rail 6.

When the shift rail 6 moves, for example, from the neutral position to the second speed position in accordance with the shifting operation using the shift lever 1, the ball 15 leaves the poppet groove 6b and fits in the poppet groove 6c. As the shift rail 6 moves, a sleeve 8, which is rotatably supported by the arcuate tip end of a fork 7 provided integrally with the shift rail 6, moves to the left in FIG. 1 on a spline of a key (shown integrally with a clutch hub 10) mounted to a clutch hub 10 of the main shaft 9 via a spreader spring (not shown). During this movement, the sleeve 8 pushes the key inward against the spring force of the spreader spring. Accordingly, a synchronization ring 11 is urged against a clutch gear 12 integral with a gear mounted on the main shaft of the transmission.

Before synchronization is completed, when there is a difference in circumferential speed between the synchronization ring 11 and the gear 12, the ring 11 rotates to a rotation position where further movement of the sleeve 8 is inhibited. Thereafter, when synchronization is completed, the synchronization ring 11 returns to a rotation position where the movement of the sleeve 8 is permitted, so that the sleeve 8 engages with the gear 12. Thereupon, the second speed is established, and the driving force of an engine (not shown) is transmitted to the main shaft 9 via the elements 8 and 10 to 12.

When speed is changed to the first speed, the sleeve 8 moves in the direction opposite to the direction for speed change to the second speed (to the right in FIG. 1), so that the sleeve 8 engages with another gear (not shown) other than the gear 12, the first speed being established.

During the time when the first or second speed is established, the end face 6d or 6e of the shift rail 6 lies at an axial position facing the bottom face 3d or 3e of the hole 3a or 3b of the housing 3 with a small gap d as shown in FIG. 2. In other words, the shift rail is allowed to be displaced in the axial direction by the distance equivalent to the gap d.

On the other hand, there is a clearance equivalent to the manufacturing tolerance between the components of the transmission, for example, between the sleeve 8 and the key of the clutch hub 10. For this reason, during the speed change, the elements 8 to 12 sometimes rotate with the axis of the sleeve 8 and the axis of the clutch hub 10 being not in parallel with each other as shown in FIG. 1 in an exaggerated manner. In this case, the sleeve 8 vibrates.

As described above, the shift rail 6 and the sleeve 8 are connected to each other via the fork 7, and the shift rail 6 can be displaced in the axial direction. If the sleeve 8 vibrates, therefore, the vibration of the sleeve 8 is transmitted to the shift rail 6 via the fork 7, so that the shift rail 6 vibrates in the axial direction. This vibration is transmitted to the shift lever 1 via the transmission lever 4 and the shift cable 5. If the shift lever 1 is vibrating when the shift lever 1 is operated, the driver has a feeling of dissatisfaction or incompatibility. That is to say, the feeling of shifting operation is worsened.

As the measures to solve the above problem, the increase in machining accuracy of the components of the transmission such as the sleeve 8 and the clutch hub 10 is possible. In this case, however, the manufacturing cost of the parts increases greatly. Moreover, even if the machining accuracy is increased, the vibration of the sleeve 8 cannot be overcome completely.

SUMMARY OF THE INVENTION

An object of the present invention is to provide a manual transmission in which the occurrence of vibration in the transmission during speed change is prevented by a simple configuration, by which the feeling of shifting operation is improved.

According to the present invention, a manual transmission is provided which comprises a shift rail which is connected to a shift lever operable by a driver and which is supported by a housing so as to be axially movable, a sleeve connected to the shift rail via a shift fork, and a positioning mechanism for positioning the shift rail. The shift rail has end faces respectively facing surfaces of the housing. The shift rail is provided with a plurality of engagement grooves formed at axial positions respectively corresponding to a plurality of gear shift positions. When the speed change for establishing a desired gearshift position is completed, the positioning mechanism engages with the engagement groove corresponding to the desired gearshift position.

The manual transmission according to the present invention is characterized in that during the speed change, as the shift rail moves in the axial direction, one of the shift rail end faces moves in the direction apart from the positioning mechanism and approaches a corresponding one of the housing surfaces. After the speed change is completed, the shift rail is axially held by the corresponding one of housing surfaces and the positioning mechanism.

The advantage of the present invention is that after the speed change is completed, the shift rail is held by the housing surface and the positioning mechanism in the axial direction so that the substantial axial movement of the shift rail is prevented. Therefore, even if the vibration of the sleeve is transmitted to the shift rail via the shift fork, the shift rail does not vibrate. Alternatively, the vibration of the shift rail is reduced greatly. As a result, the vibration of the shift lever connected to the shift rail is eliminated or reduced, so that the driver does not have a feeling of dissatisfaction during the speed change. That is to say, the feeling of shifting operation is improved.

Moreover, since the axial movement of the shift rail is inhibited by the existing positioning device and the housing surface, no special device is needed, and consequently the system configuration is simple. Also, it is unnecessary to enhance the machining accuracy of the sleeve and the peripheral elements thereof than needed to prevent the vibration of the sleeve. Therefore, neither the number of parts of the transmission nor the cost increases. That is to say, a transmission having an excellent feeling of shifting operation is provided at a low cost.

Preferably, the transmission further includes synchronization mechanisms respectively interposed between the sleeve and gears respectively associated with the plurality of gearshift positions. During speed change, one of the synchronization mechanisms which is associated with the speed change eliminates the difference in circumferential speed between the sleeve and one of the gears which is associated with the speed change. Therefore, the speed change can be performed smoothly.

Preferably, the positioning mechanism includes a cylindrical poppet plug provided on the housing, and the poppet plug includes a plug body having an opening on the shift rail side, a positioning ball disposed in the plug body, and a spring member disposed in the plug body for urging the positioning ball against the shift rail. The positioning ball partially protrudes through the opening of the plug body and is engageable selectively with any one of the engagement grooves of the shift rail. Each of the engagement grooves of the shift rail has two engagement surfaces extending at positions or in regions different from each other in the axial direction of the shift rail. When the speed change is completed, the positioning ball abuts on that one of the engagement surfaces of the engagement groove, with which the positioning ball engages, which surface is on the side of the one shift rail end face with respect to the axial center of the engagement groove. Whereby the positioning ball applies an action force for preventing the axial movement of the shift rail to the shift rail.

According to this preferred embodiment, the positioning ball, which cannot be moved in the axial direction with respect to the housing, applies an action force for preventing the axial movement of the shift rail to the shift rail via the shift rail engagement surface. For this reason, the axial movement of the shift rail to the positioning ball side can be prevented reliably.

Preferably, the one shift rail end face abuts on the corresponding one housing surface when the speed change is completed. In this case, the axial movement of the shift rail to the corresponding one housing surface side can be prevented reliably.

Preferably, the transmission is configured so as to establish a neutral position. The shift rail has a neutral groove formed at the axial position corresponding to the neutral position. A distance between the shift rail end face and the housing surface, which faces the shift rail end face, at the time when the positioning mechanism engages with the neutral groove is smaller than the center distance between the neutral groove and each of the engagement grooves. In this case, when the one of shift rail end faces abuts on the housing surface due to the shift rail movement caused by the speed change, the positioning mechanism lies at an axial position slightly on the one shift rail end face side, and in turn, on the corresponding one housing surface side with respect to the axial center of the engagement groove with which the positioning mechanism engages at this time. Thereupon, the positioning mechanism applies an action force toward the housing surface side to the shift rail. As a result, the shift rail is reliably held by the housing surface and the positioning mechanism, so that the axial movement of the shift rail is prevented reliably.

Preferably, an elastic member such as a spring member is disposed between each of the shift rail end faces and the housing surface facing the shift rail end face. In this case, when the speed change is completed, the one of shift rail end faces abuts on the housing surface facing it via the elastic member. Therefore, the axial movement of the shift rail to the housing surface side can be inhibited reliably by the elastic member and the housing surface. Also, the vibration of the shift rail is absorbed by the elastic member. Since the elastic member is provided between the shift rail end face and the housing surface, the manufacturing tolerance concerning the center distance between the neutral groove and the engagement groove and the distance between the shift rail end face and the housing surface can be increased, so that the manufacturing cost of the transmission can be reduced.

Preferably, the shift rail is formed with axial holes which open at the respective shift rail end faces, and the spring members are housed in the respective axial holes. Alternatively, the housing is formed with axial holes which open at the respective housing surfaces, and the spring members are housed in the respective axial holes. Alternatively, the shift rail is formed with axial holes which open at the respective shift rail end faces, and each of the axial holes houses a corresponding one of the spring members and a support ball urged outwardly of the axial hole by the spring member. More preferably, a retaining member for retaining the support ball in the axial hole is mounted on each of the shift rail end faces, each of the retaining members is provided with an opening, and the support ball partially protrudes from the opening.

In any case, when the speed change is completed, one shift rail end face abuts on the corresponding one housing surface via the corresponding spring member or via the spring member and the support ball. Since the spring member or the spring member and the support ball are housed in the axial hole and held in place, the axial support of the shift rail using the spring member or the spring member and the support ball can be accomplished reliably, so that the feeling of shifting operation can be improved. Also, the vibration of shift rail can be absorbed by the spring member. Further, the manufacturing tolerance of the transmission component such as the shift rail can be increased, by which the manufacturing cost of the transmission can be reduced.

BRIEF DESCRIPTION OF THE DRAWINGS

FIG. 1 is a schematic view of a conventional manual transmission;

FIG. 2 is a fragmentary enlarged view of a shift rail and a poppet plug shown in FIG. 1, and peripheral elements;

DESCRIPTION OF THE PREFERRED EMBODIMENTS

Figure 3:
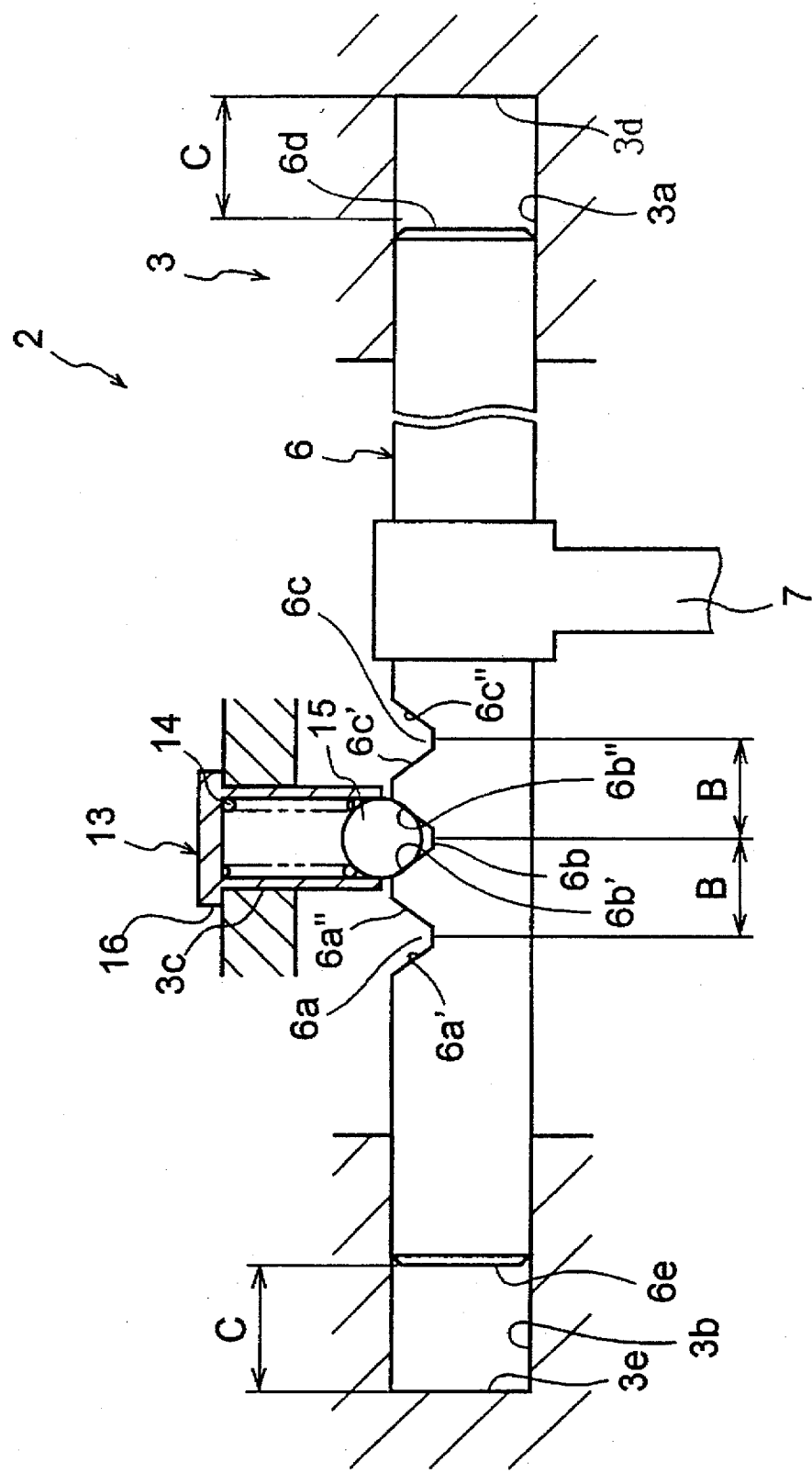
FIG. 3 is a fragmentary enlarged view of a shift rail, a poppet plug, and peripheral elements of a manual transmission according to a first embodiment of the present invention.

A manual transmission according to a first embodiment of the present invention will be described below with reference to FIG. 3.

The basic configuration of the transmission of this embodiment is the same as that of the conventional transmission shown in FIGS. 1 and 2. Therefore, the explanation of the configuration and operation of the transmission of this embodiment is partially omitted. In FIG. 3, the same reference numerals are applied to the same elements as those shown in FIG. 2.

As shown in FIG. 3, opposite ends of a shift rail 6 are inserted in holes 3a and 3b of a housing 3, so that the shift rail 6 is supported by the housing 3 in such a manner as to move in the axial direction. The shift rail 6 is provided with poppet grooves 6a, 6b, and 6c for positioning the shift rail 6, which grooves correspond to the first speed position, the neutral position, and the second speed position, respectively.

The poppet groove 6a has two inclined surfaces (engagement surfaces) 6a' and 6a", and both the inclined surfaces 6a' and 6a" extend in regions different from each other in the axial direction of the shift rail 6. The poppet grooves 6b and 6c also have similar inclined surfaces 6b' and 6b", and 6c' and 6c", respectively.

The housing 3 is provided with a poppet plug 13, which is a positioning mechanism. The poppet plug 13 comprises a positioning ball 15 engageable selectively with any one of the poppet grooves 6a to 6c according to the movement of the shift rail 6, a poppet spring 14 for urging the ball 15 against the shift rail 6, and a plug body 16 for housing and retaining the ball 15 and the poppet spring 14.

Figure 4:
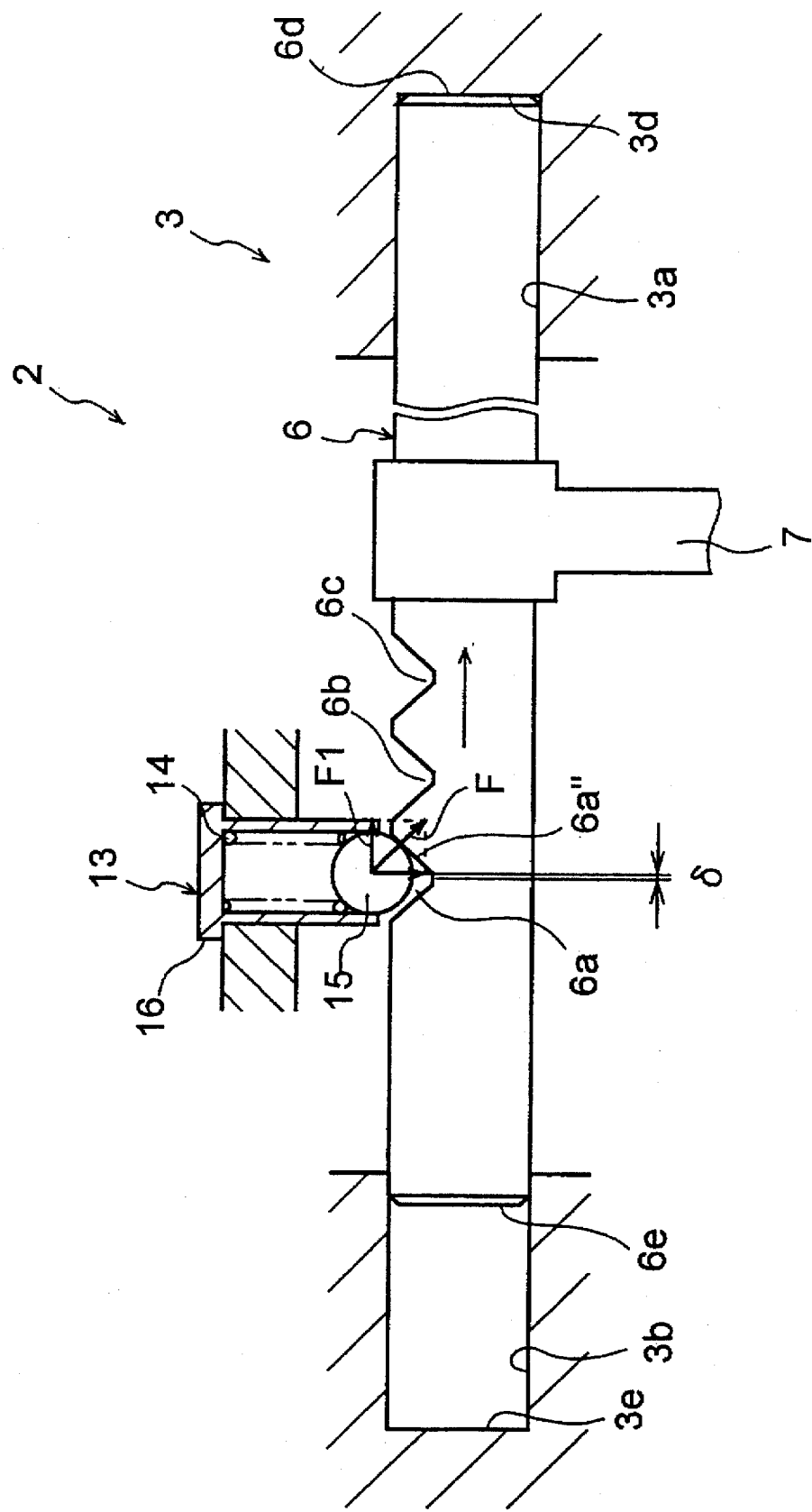
FIG. 4 is a view, similar to FIG. 3, showing an operating state of the shift rail, the poppet plug, and the peripheral elements when speed change from the neutral position shown in FIG. 3 to the first speed position is completed.

In FIG. 3, reference character B denotes the center distances between the poppet grooves 6a and 6b and between the poppet grooves 6b and 6c. Reference character C denotes the distances between the shift rail end face 6d or 6e and the housing surface 3d or 3e, which faces the shift rail end face, at the time when the ball 15 engages with the poppet groove 6b so that the shift rail 6 is positioned at an axial position corresponding to the neutral position. The center distance B is set so as to be longer than the distance C by a slight dimension δ (FIG. 4).

Next, the operation of the above-described transmission will be described.

When a shift lever 1 (FIG. 1) is at the neutral position, the shift rail 6 is at an axial position corresponding to the neutral position (hereinafter simply called a neutral position), as shown in FIG. 3. At this time, the ball 15 of the poppet plug 13 fits in the poppet groove 6b by the spring force of the spring 14, and uniformly presses the engagement surfaces 6b' and 6b" of the poppet groove 6b. Thereby, the shift rail 6 is kept at the neutral position. In this state, each end face 6d and 6e of the shift rail 6 faces respective bottom faces (housing surfaces) 3d and 3e of holes 3a and 3b in the housing 3 with the above distance C being present.

When the shift lever 1 is moved from the neutral position to, for example, the first speed position, the shift rail 6 moves to the right in FIG. 3. During this movement of the shift rail 6, the inclined surface 6b' of the poppet groove 6b pushes up the ball 15 against the spring force of the spring 14 of the poppet plug 13. As the shift rail 6 moves further, the ball 15 is pushed out of the poppet groove 6b, and then pushed into the poppet groove 6a. During this time, therefore, the driver who operates the shift lever 1 has a sense of response.

During the above speed change, as the shift rail 6 moves to the right in the axial direction, the shift rail end face 6d moves in the direction of going apart from the poppet plug 13, and comes close to the housing surface 3d. After the speed change is completed, the shift rail end face 6d abuts on the housing surface 3d, and the ball 15 engages with the poppet 6a to position the shift rail 6.

It should be noted that in the transmission of this embodiment, as described above, the center distance B between the poppet groove 6b and the poppet groove 6a is set so as to be longer than the distance C between the shift rail end face 6d and the housing surface 3d by a small length δ.

Therefore, when the shift rail end face 6d abuts on the housing surface 3d after the speed change is completed, the ball 15 of the poppet plug 13 is at an axial position slightly on the shift rail end face 6d (housing surface 3d) side with respect to the axial center of the poppet groove 6a. Specifically, when the speed change is completed, the ball 15 of the poppet plug 13 is located at an upper part of the inclined surface 6" on the poppet groove 6b side of the poppet groove 6a (on the shift rail end face 6d side with respect to the axial center of the poppet groove 6a), as shown in FIG. 4. In other words, the poppet plug 13 and the ball thereof are at a position shifting from the axial center of the poppet groove 6a to the poppet groove 6b side by a small distance δ.

At this shifting position, the ball 15 is pressed against the inclined surface 6a" by the spring force of the spring 14. This pressing force F acts perpendicularly to the inclined surface 6a'', and the axial component F1 of the force acts so as to press the shift rail 6 to the right. As a result, the shift rail end face 6d is pressed against the housing surface 3d. In other words, the shift rail 6 is held by the shift rail end housing surface 3d and the ball 15 in the axial direction. Therefore, the substantial axial movement of the shift rail 6 is restricted.

Consequently, even if a vibration occurs on the sleeve 8 during the speed change, and is transmitted to the shift rail 6 via a fork 7, the shift rail, which is supported so as not to be movable in the axial direction, does not vibrate. Alternatively, the vibration of the shift rail 6 is reduced greatly. Therefore, the transmission of vibration of the sleeve 8 to the shift lever 1, which is connected to the sleeve 8 via the fork 7, the shift rail 6, the transmission lever 4 and the shift cable 5, is restricted. For this reason, the vibration of the shift lever 1 due to the vibration of the sleeve 8 is reduced greatly.

Figure 5:
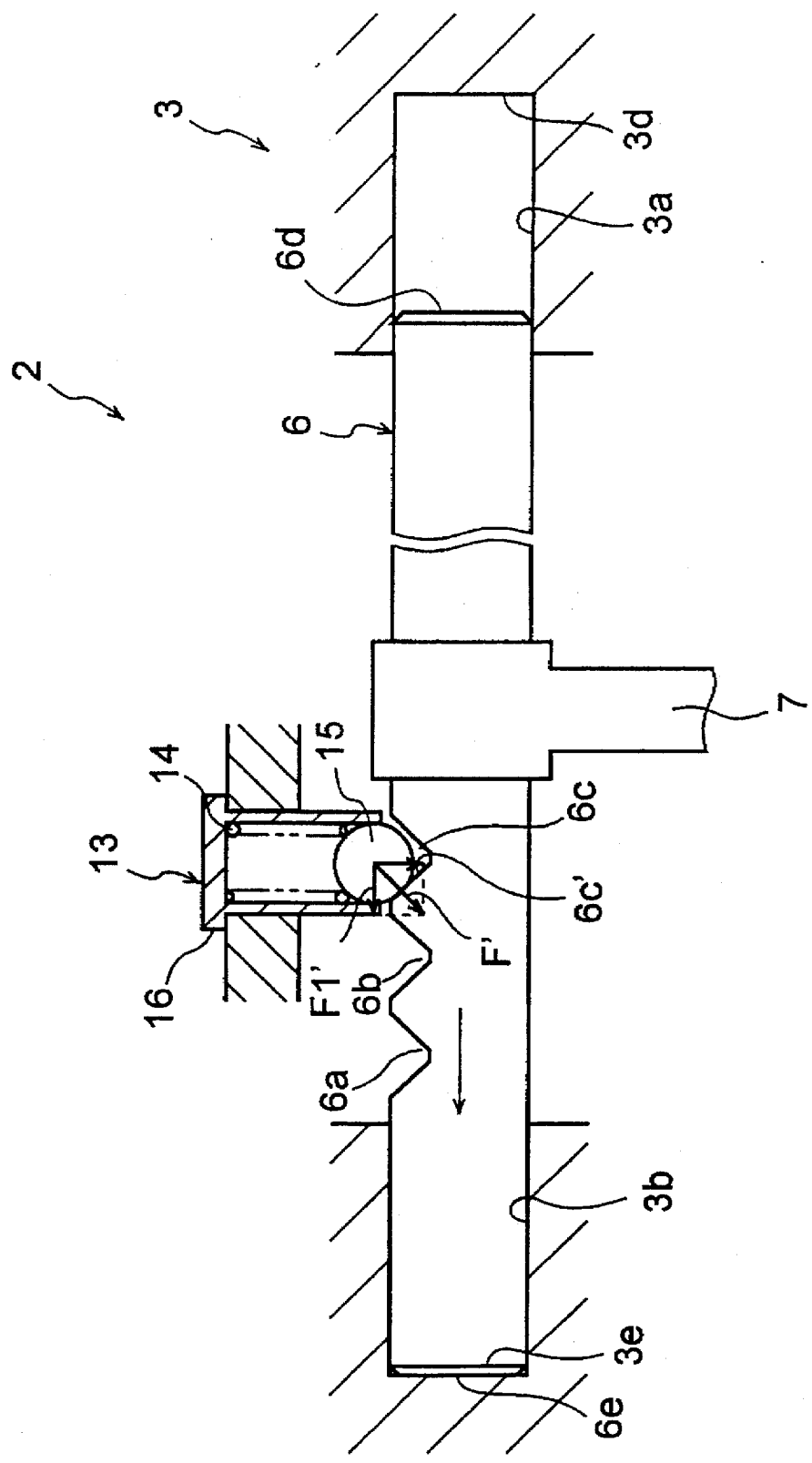
FIG. 5 is a view, similar to FIG. 4, showing an operating state of the shift rail, the poppet plug, and the peripheral elements when speed change from the first speed position shown in FIG. 4 to the second speed position is completed.

When the shift lever 1 is operated from the first speed position to the second speed position over the neutral position, the shift rail 6 moves to the left in FIG. 5. As the shift rail 6 moves, the ball 15 of the poppet plug 13 is pushed out of the poppet groove 6a and pushed into the poppet groove 6b. Then, the ball 15 is pushed out of the poppet groove 6b and pushed into the poppet groove 6c. During this time, the shift rail end face 6e comes close to the housing surface 3e, and finally abuts on the housing surface 3e. At this time, the ball 15 is located at an upper part of the inclined surface 6c' of the poppet groove 6c on the poppet groove 6b side (FIG. 5). The axial component F1' of the pressing force F' applied to the inclined surface 6c' from the ball acts so as to press the shift rail 6 to the left. As a result, the shift rail end face 6e is pressed against the housing surface 3e, so that the shift rail 6 is held by the housing surface 3e and the ball 15. Thereupon, the axial displacement of the shift rail is restricted. For this reason, even if a vibration occurs on the sleeve 8, the transmission of vibration to the shift lever 1 via the shift rail 6 and the like, and in turn, the vibration of the shift lever 1 is prevented. Consequently, a feeling of dissatisfaction the driver has during shift lever operation is reduced greatly.

Next, a manual transmission according to a second embodiment of the present invention will be described with reference to FIG. 6.

The transmission of this embodiment is basically configured in the same manner as that of the first embodiment described above. Therefore, the explanation of the configuration and operation of the transmission of this embodiment is partially omitted.

The transmission of this embodiment is characterized in that after speed change is completed, the shift rail 6 is held by the housing surface 3d or 3e and the ball 15 of the poppet plug 13 in the axial direction by abutting the shift rail end face 6d or 6e on the housing surface 3d or 3e via an elastic stopper mechanism.

Figure 6:
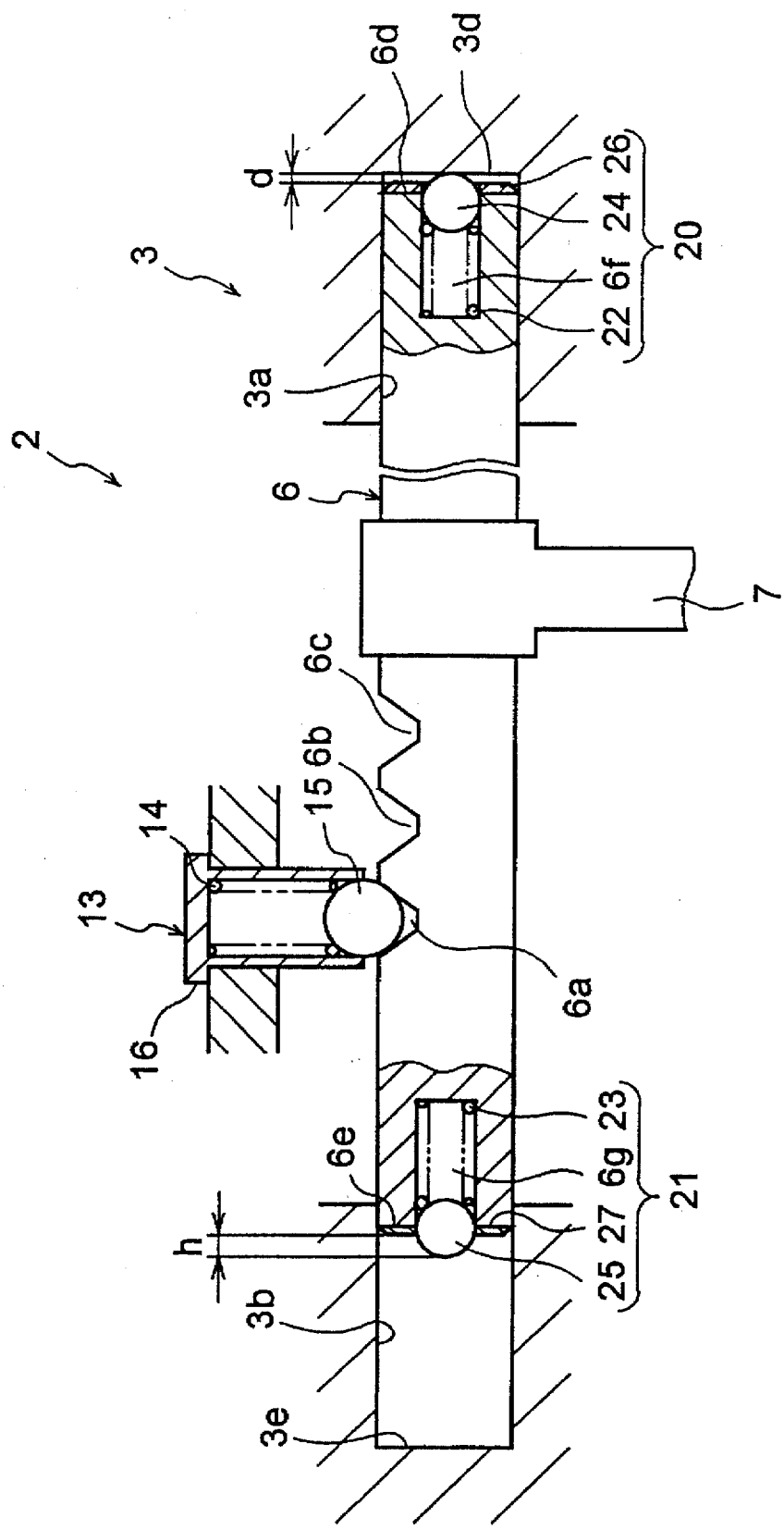
FIG. 6 is a view, similar to FIG. 3, showing a manual transmission according to a second embodiment of the present invention.

Referring to FIG. 6, the stopper mechanisms 20 and 21 are provided on the shift rail end faces 6d and 6e, respectively. Specifically, the shift rail 6 is formed with axial holes 6f and 6g which open at the shift rail end faces 6d and 6e, respectively. The axial hole 6f houses a spring 22, which is an elastic member, and a support ball 24, while the axial hole 6g houses a spring 23 and a ball 25. On the shift rail end face 6d and 6e, end plates 26 and 27 are fixed as retaining members for preventing the support balls 24 and 25 from coming off, respectively. A hole with a diameter slightly smaller than the outside diameter of the ball 24, 25 is formed at the center of the end plate 26, 27, so that a part of the ball 24, 25 protrudes from this hole by being pressed by the spring force of the spring 22, 23. The protrusion height of the ball 24, 25 from the end plate 26, 27 is slightly smaller than the radius of the ball 24, 25.

In this embodiment, the center distance between the poppet grooves 6a and 6b and between the poppet grooves 6b and 6c (corresponding to center distance B shown in FIG. 3) is set at a value smaller by a small value d than the distance between the end plate 26 or 27 and the housing surface 3d or 3e, which faces the end plate 26 or 27 (corresponding to distance C shown in FIG. 3), at the time when the ball 15 engages with the poppet 6b and the shift rail 6 is positioned at the axial position corresponding to the neutral position. The protrusion height h of the ball 24 from the end plate 26 and the protrusion height h of the ball 25 from the end plate 27 are set at a value slightly larger than the value d.

Next, the operation of the transmission shown in FIG. 6 will be described.

When the shift lever 1 is operated from the neutral position to the first speed position, the shift rail 6 moves to the right in FIG. 6. After the speed change to the first speed by the operation of the shift lever 1 is completed, the positioning ball 15 of the poppet plug 13 engages with the poppet groove 6a of the shift rail 6. Thereby, the shift rail 6 is positioned and locked by the ball 15. After the speed change is completed, the shift rail 6 takes an axial position such that the end face of the end plate 26 faces the housing surface 3d with clearance d. Since the protrusion height h of the support ball 24 from the end plate 26 is larger than clearance d, the support ball 24 of the stopper mechanism 20 abuts on the housing surface 3d just before the completion of speed change. As the shift rail 6 moves subsequently to the right, the ball 24 is pressed into the axial hole 6f against the spring force of the spring 22. Therefore, after the speed change is completed, the ball 24 is pressed into the axial hole 6f by a length equal to the difference (h–d) between the protrusion height and the clearance. In other words, the spring 22 is compressed by a length of (h–d), so that the spring force corresponding to this compression length is generated. As a result, the shift rail end face 6d abuts on the housing surface 3d via the stopper mechanism 20 while being subjected to a reaction from the housing surface 3d, which corresponds to the spring force and acts to the left.

In this manner, after the speed change is completed, the shift rail 6 is held by the positioning ball 15 of the poppet plug 13, which engages with the poppet groove 6a, and the housing surface 3d in the axial direction. As a result, the axial displacement of the shift rail 6 is prevented. Therefore, even if a vibration occurs on the sleeve 8 during the speed change, the transmission of vibration from the sleeve 8 to the shift lever 1 via interposing elements including the shift rail 6 is restricted, so that a feeling of dissatisfaction due to the vibration of the shift lever 1, which the driver has during the shift lever operation, is reduced.

If the shift lever 1 is operated to the second speed position and the shift rail 6 moves to the left in FIG. 6, as with the case of speed change to the first speed described above, when the speed change is completed, the ball 15 of the poppet plug 13 engages with the poppet groove 6c of the shift rail 6, and the shift rail end face 6e abuts on the housing surface 3e via the stopper mechanism 21. As a result, the shift rail 6 is held by the housing surface 3e and the ball 15 in the axial direction, so that the axial movement of the shift rail 6 is prevented.

Next, a transmission according to a third embodiment of the present invention will be described with reference to FIG. 7.

The transmission of this embodiment is basically configured in the same manner as that of the first and second embodiments described above. Therefore, the explanation of the configuration and operation of the transmission of this embodiment is partially omitted.

The transmission of this embodiment is characterized in that simple, elastic stopper mechanisms consisting of springs 30 and 31 are provided on the housing surfaces 3d and 3e, respectively.

Figure 7:
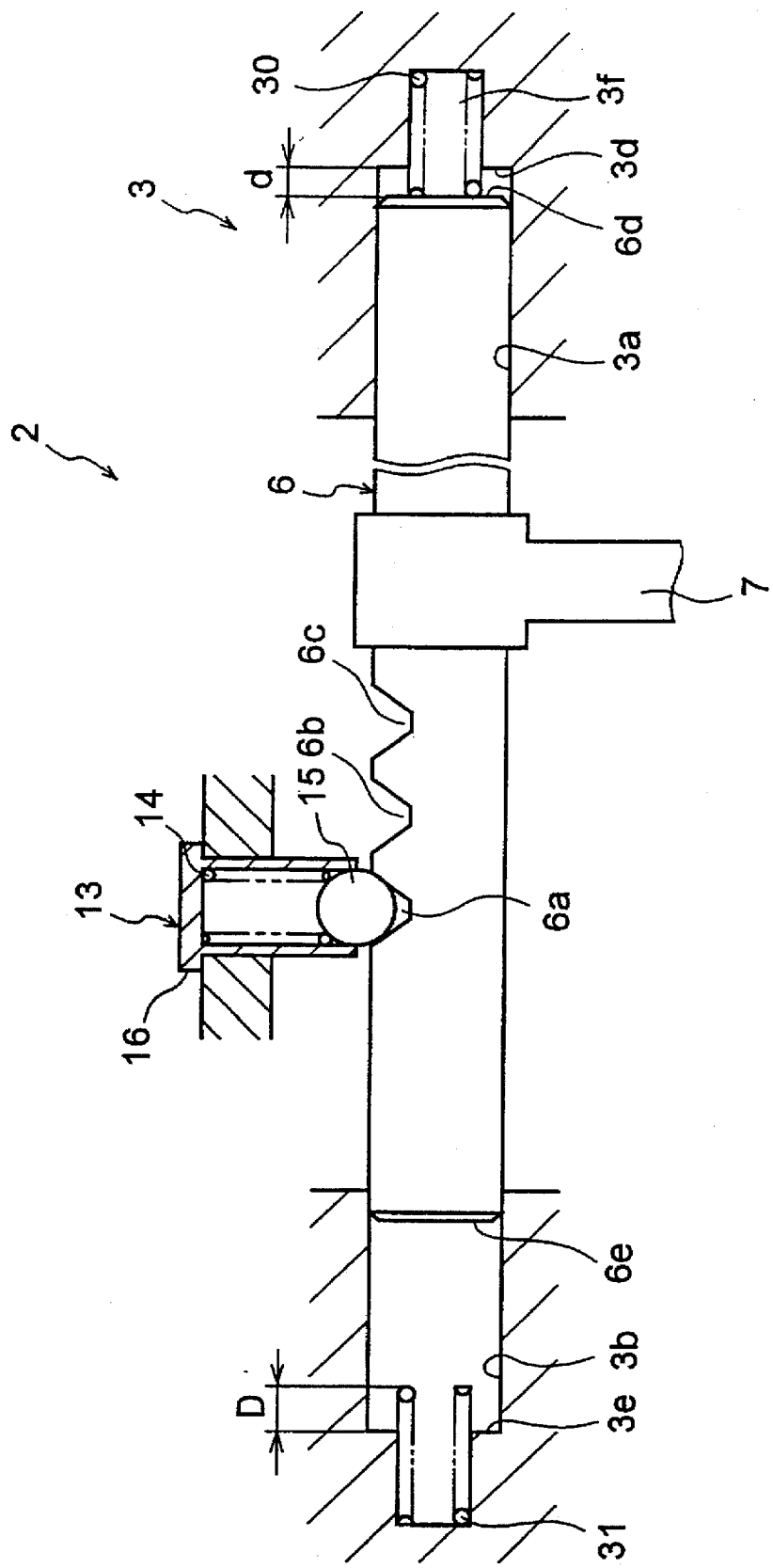
FIG. 7 is a view, similar to FIG. 3, showing a manual transmission according to a third embodiment of the present invention.

Referring to FIG. 7, the housing 3 is formed with axial holes 3f and 3g which open at the housing surfaces 3d and 3e. The spring 30 is housed in the axial hole 3f, and the end of the spring 30 on the shift rail 6 side protrudes from the housing surface 3d by a predetermined length of D longer than the clearance d described above. Similarly, the spring 31 is housed in the axial hole 3g, and the end of the spring 31 on the shift rail 6 side protrudes from the housing surface 3e by the predetermined length of D.

In the transmission configured as described above, when the shift lever 1 is operated to the first speed position, the shift rail 6 moves to the right in FIG. 7. Just before the movement of the shift rail 6 due to this speed change is completed, the shift rail end face 6d abuts on the spring 30. After the speed change is completed, the shift rail 6 takes an axial position such that the end face 6d of the shift rail 6 faces the housing surface 3d with clearance d. After the speed change is completed, therefore, the spring 30 is compressed by a distance corresponding to the difference (D–d) between the protrusion length D and the clearance d, so that a spring force which presses the shift rail 6 to the left in FIG. 7 is generated. That is to say, after the speed change is completed, the shift rail end face 6d is pressed against the housing surface 3d via the spring 30. On the other hand, the shift rail 6 is positioned and locked by the ball 15 of the poppet plug 13 engaging with the poppet groove 6a. Therefore, the shift rail 6 is held by the housing surface 3d and the ball 15 in the axial direction, so that the axial displacement of the shift rail 6 is prevented. This reduces a feeling of dissatisfaction during the operation of the shift lever.

When the shift lever 1 is operated to the second speed position, the shift rail 6 moves to the left in FIG. 7. After the speed change is completed, the shift rail 6 is positioned by the positioning ball 15 engaging with the poppet groove 6c of the shift rail 6, and the shift rail end face 6e abuts on the housing surface 3e via the spring 31. As a result, the shift rail 6 is held by the housing surface 3e and the ball 15 in the axial direction.

The present invention is not limited to the first to third embodiments described above, but can be modified variously.

For example, in each embodiment, the case where the present invention is applied to a remote control type synchronously engaged transmission which performs speed change between the first and second speeds has been explained, but the present invention can be applied to a transmission without a synchronization mechanism. Also, the present invention can be applied to a speed change other than that between the first and second speed change, for example, to a speed change between the third and fourth speeds. Further, the present invention can be applied to a transmission having a direct control type operation device.

What is claimed is:

1. A manual transmission having a shift rail which is connected to a shift lever operable by a driver and which is supported by a housing so as to be axially movable, a sleeve connected to the shift rail via a shift fork, and a positioning mechanism for positioning the shift rail; the shift rail having end portions which respectively face surfaces of said housing, each of said shift rail end portions having an end face, and a plurality of engagement grooves formed at axial positions which respectively correspond to a plurality of gearshift positions; and said positioning mechanism being operable to engage with that engagement groove which corresponds to a desired gearshift position when the speed change for establishing the desired gearshift position is completed, the improvement comprising:

one of said shift rail end portions moves in a direction apart from said positioning mechanism and approaching a corresponding one of the housing surface as said shift rail axially moves during said speed change; and said one shift rail end portion abutting on said corresponding one housing surface and said shift rail is axially held by the abutment between itself and said corresponding one housing surface and by said positioning mechanism after said speed change is completed.

2. The manual transmission according to claim 1, further including:

synchronization mechanisms interposed between the sleeve and gears respectively associated with the plurality of gearshift positions;

wherein that one of said synchronization mechanisms which is associated with said speed change eliminates a difference in circumferential speed between the sleeve and that one of said gears which is associated with said speed change during said speed change.

3. The manual transmission according to claim 1, wherein said positioning mechanism includes a cylindrical poppet plug provided on the housing;

said poppet plug includes a plug body having an opening on a shift rail side, a positioning ball disposed in said plug body, which partially protrudes through said opening of said plug body and is engagable selectively with any one of said engagement grooves of said shift rail, and a spring member disposed in said plug body for urging said positioning ball against the shift rail;

each of the engagement grooves of the shift rail has two engagement surfaces extending at positions or in regions different from each other in an axial direction of the shift rail; and said positioning ball abuts on that one of said engagement surfaces of that engagement groove, with which said positioning ball engages, which surface is on a side of said one shift rail end portion with respect to an axial center of said engagement groove, when said speed change is completed, whereby said positioning ball applies an action force to the shift rail to prevent an axial movement of the shift rail (6).

4. The manual transmission according to claim 1, wherein said one shift rail end portion directly abuts at its end face on said corresponding one housing surface when said speed change is completed.

5. The manual transmission according to claim 4, wherein said transmission is configured so as to establish a neutral position;

the shift rail has a neutral groove formed at an axial position corresponding to said neutral position; and a distance (C) between each of said shift rail end faces and the housing surface facing said each shift rail end face at the time when said positioning mechanism engages with said neutral groove is smaller than a center distance between said neutral groove and each of said engagement grooves.

6. The manual transmission according to claim 1, wherein said one shift rail end portion abuts on said corresponding one housing surface through an elastic member disposed therebetween.

7. The manual transmission according to claim 6, wherein said elastic member is formed by a spring member.

8. The manual transmission according to claim 7, wherein the shift rail is formed with axial holes which respectively open at the shift rail end faces;

said spring members are housed in said axial holes, respectively; and said one shift rail end face abuts on said corresponding one housing surface via a corresponding one of said spring members when said speed change is completed.

9. The manual transmission according to claim 7, wherein the shift rail is formed with axial holes which respectively open at the shift rail end faces;

each of said axial holes houses a corresponding one of said spring members and a support ball urged outwardly of said axial hole by said corresponding one spring member; and said one shift rail end face abuts on said corresponding one housing surface via said spring member and said support ball corresponding to said one shift rail end face when said speed change is completed.

10. The manual transmission according to claim 9, wherein retaining members for respectively retaining said support balls in said axial holes, are respectively mounted on said shift rail end faces, each of said retaining members is provided with an opening, and said support balls partially protrude from said openings, respectively.

11. The manual transmission according to claim 7, wherein said housing is formed with axial holes which respectively open at said housing surfaces;

said spring members are housed in said axial holes, respectively; and said one shift rail end face abuts on said corresponding one housing surface via a corresponding one of said spring members when said speed change is completed.

* * * * *